United States Patent
Rao et al.

(10) Patent No.: US 11,640,245 B2
(45) Date of Patent: May 2, 2023

(54) LOGICAL STORAGE DEVICE ACCESS IN AN ENCRYPTED STORAGE ENVIRONMENT

(71) Applicant: EMC IP Holding Company LLC, Hopkinton, MA (US)

(72) Inventors: Vinay G. Rao, Bangalore (IN); Sanjib Mallick, Bangalore (IN); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 38 days.

(21) Appl. No.: 17/177,821

(22) Filed: Feb. 17, 2021

(65) Prior Publication Data

US 2022/0261157 A1    Aug. 18, 2022

(51) Int. Cl.
G06F 3/06 (2006.01)

(52) U.S. Cl.
CPC ............ *G06F 3/0611* (2013.01); *G06F 3/065* (2013.01); *G06F 3/0619* (2013.01); *G06F 3/0622* (2013.01); *G06F 3/0659* (2013.01); *G06F 3/0665* (2013.01); *G06F 3/0688* (2013.01)

(58) Field of Classification Search
None
See application file for complete search history.

(56) References Cited

U.S. PATENT DOCUMENTS

| | | |
|---|---|---|
| 6,567,397 B1 | 5/2003 | Smigelski et al. |
| 6,687,746 B1 | 2/2004 | Shuster et al. |
| 6,697,875 B1 | 2/2004 | Wilson |
| 7,275,103 B1 | 9/2007 | Thrasher et al. |
| 7,454,437 B1 | 11/2008 | Lavallee et al. |
| 7,617,292 B2 | 11/2009 | Moore et al. |
| 7,668,981 B1 | 2/2010 | Nagineni et al. |

(Continued)

FOREIGN PATENT DOCUMENTS

| | | |
|---|---|---|
| CN | 103677927 B | 2/2017 |
| EP | 1117028 A2 | 7/2001 |

(Continued)

OTHER PUBLICATIONS

Kris Piepho, "Dell EMC SC Series Storage: Microsoft Multipath I/O," Dell EMC Best Practices, Jan. 2017, 57 pages.

(Continued)

*Primary Examiner* — Stephanie Wu
(74) *Attorney, Agent, or Firm* — Ryan, Mason & Lewis, LLP

(57) ABSTRACT

A method comprises associating a first logical storage device with a first host device, wherein data encrypted using a private key of the first host device is written to the first logical storage device, generating a copy of the first logical storage device, associating the copy of the first logical storage device with a second logical storage device, wherein data encrypted using a private key of a second host device is written to the second logical storage device, and providing the second host device with access to an encrypted version of a public key of the first host device, encrypted using a public key of the second host device, to allow the second host device to obtain the public key of the first host device. The second host device can thereby access particular data of the second logical storage device written using the private key of the first host device.

20 Claims, 4 Drawing Sheets

(56) References Cited

U.S. PATENT DOCUMENTS

| | | |
|---|---|---|
| 7,770,053 B1 | 8/2010 | Bappe et al. |
| 7,809,912 B1 | 10/2010 | Raizen et al. |
| 7,818,428 B1 | 10/2010 | Lavallee et al. |
| 7,890,664 B1 | 2/2011 | Tao et al. |
| 7,904,681 B1 | 3/2011 | Bappe et al. |
| 7,925,872 B2 | 4/2011 | Lai et al. |
| 8,250,256 B2 | 8/2012 | Ghosalkar et al. |
| 8,285,825 B1 | 10/2012 | Nagaraj et al. |
| 8,825,919 B1 | 9/2014 | Lim et al. |
| 8,832,334 B2 | 9/2014 | Okita |
| 8,874,746 B1 | 10/2014 | Gonzalez |
| 9,026,694 B1 | 5/2015 | Davidson et al. |
| 9,201,803 B1 | 12/2015 | Derbeko et al. |
| 9,400,611 B1 | 7/2016 | Raizen |
| 9,430,368 B1 | 8/2016 | Derbeko et al. |
| 9,594,780 B1 | 3/2017 | Esposito et al. |
| 9,647,933 B1 | 5/2017 | Tawri et al. |
| 9,672,160 B1 | 6/2017 | Derbeko et al. |
| 9,778,852 B1 | 10/2017 | Marshak et al. |
| 10,289,325 B1 | 5/2019 | Bono |
| 10,353,714 B1 | 7/2019 | Gokam et al. |
| 10,439,878 B1 | 10/2019 | Tah et al. |
| 10,474,367 B1 | 11/2019 | Mallick et al. |
| 10,476,960 B1 | 11/2019 | Rao et al. |
| 10,521,369 B1 | 12/2019 | Mallick et al. |
| 10,606,496 B1 | 3/2020 | Mallick et al. |
| 10,637,917 B2 | 4/2020 | Mallick et al. |
| 10,652,206 B1 | 5/2020 | Pusalkar et al. |
| 10,754,572 B2 | 8/2020 | Kumar et al. |
| 10,757,189 B2 | 8/2020 | Mallick et al. |
| 10,764,371 B2 | 9/2020 | Rao et al. |
| 10,789,006 B1 | 9/2020 | Gokam et al. |
| 10,817,181 B2 | 10/2020 | Mallick et al. |
| 10,838,648 B2 | 11/2020 | Sharma et al. |
| 10,880,217 B2 | 12/2020 | Mallick et al. |
| 10,884,935 B1 | 1/2021 | Doddaiah |
| 10,911,402 B2 | 2/2021 | Pusalkar et al. |
| 2002/0023151 A1 | 2/2002 | Iwatani |
| 2002/0103923 A1 | 8/2002 | Cherian et al. |
| 2002/0194294 A1* | 12/2002 | Blumenau ............... H04L 61/35 709/213 |
| 2004/0010563 A1 | 1/2004 | Forte et al. |
| 2006/0026346 A1 | 2/2006 | Kadoiri et al. |
| 2006/0277383 A1 | 12/2006 | Hayden et al. |
| 2007/0174849 A1 | 7/2007 | Cheung et al. |
| 2008/0043973 A1 | 2/2008 | Lai et al. |
| 2008/0201458 A1 | 8/2008 | Salli |
| 2008/0301332 A1 | 12/2008 | Butler et al. |
| 2009/0097655 A1* | 4/2009 | Kishimoto ............... H04L 9/30 380/277 |
| 2009/0259749 A1 | 10/2009 | Barrett et al. |
| 2010/0313063 A1 | 12/2010 | Venkataraja et al. |
| 2011/0197027 A1 | 8/2011 | Balasubramanian et al. |
| 2011/0296230 A1 | 12/2011 | Chen et al. |
| 2012/0102369 A1 | 4/2012 | Hiltunen et al. |
| 2012/0246345 A1 | 9/2012 | Contreras et al. |
| 2013/0117766 A1 | 5/2013 | Bax et al. |
| 2013/0339551 A1 | 12/2013 | Flanagan et al. |
| 2014/0105068 A1 | 4/2014 | Xu |
| 2015/0222705 A1 | 8/2015 | Stephens |
| 2015/0242134 A1 | 8/2015 | Takada et al. |
| 2016/0092136 A1 | 3/2016 | Balakrishnan et al. |
| 2016/0117113 A1 | 4/2016 | Li et al. |
| 2016/0335003 A1 | 11/2016 | Ahmed et al. |
| 2017/0235507 A1 | 8/2017 | Sinha et al. |
| 2018/0189635 A1* | 7/2018 | Olarig ................... G06N 3/0454 |
| 2018/0253256 A1 | 9/2018 | Bharadwaj |
| 2018/0317101 A1 | 11/2018 | Koue |
| 2019/0095299 A1 | 3/2019 | Liu et al. |
| 2019/0108888 A1 | 4/2019 | Sarkar et al. |
| 2019/0334987 A1 | 10/2019 | Mallick et al. |
| 2020/0021653 A1 | 1/2020 | Rao et al. |
| 2020/0097203 A1 | 3/2020 | Mallick et al. |
| 2020/0106698 A1 | 4/2020 | Rao et al. |
| 2020/0110552 A1 | 4/2020 | Kumar et al. |
| 2020/0112608 A1 | 4/2020 | Patel et al. |
| 2020/0192588 A1 | 6/2020 | Kumar et al. |
| 2020/0204475 A1 | 6/2020 | Mallick et al. |
| 2020/0204495 A1 | 6/2020 | Mallick et al. |
| 2020/0213274 A1 | 7/2020 | Pusalkar et al. |
| 2020/0241890 A1 | 7/2020 | Mallick et al. |
| 2020/0314218 A1 | 10/2020 | Kumar et al. |
| 2020/0348860 A1 | 11/2020 | Mallick et al. |
| 2020/0348861 A1 | 11/2020 | Marappan et al. |
| 2020/0348869 A1 | 11/2020 | Gokam |
| 2020/0349094 A1 | 11/2020 | Smith et al. |
| 2020/0363985 A1 | 11/2020 | Gokam et al. |
| 2020/0372401 A1 | 11/2020 | Mallick et al. |
| 2021/0019054 A1 | 1/2021 | Anchi et al. |
| 2021/0026551 A1 | 1/2021 | Tidke et al. |
| 2021/0026650 A1 | 1/2021 | Rao et al. |
| 2021/0173945 A1* | 6/2021 | Karr ................... G06F 3/065 |
| 2021/0286520 A1* | 9/2021 | Baptist ................ G06F 3/067 |
| 2022/0078169 A1* | 3/2022 | Pham ................. H04L 63/0428 |

FOREIGN PATENT DOCUMENTS

| | | |
|---|---|---|
| EP | 2667569 A1 | 11/2013 |
| WO | PCT/US2019/052549 | 12/2019 |
| WO | PCT/US2019/053204 | 12/2019 |
| WO | PCT/US2019/053473 | 12/2019 |
| WO | PCT/US2019/067144 | 5/2020 |

OTHER PUBLICATIONS

NVM Express, "NVM Express, Revision 1.3," NVM Express, May 1, 2017, 282 pages.

VMWARE, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

VMWARE, Inc. "VMware VMFS Volume Management," 2009, 8 pages.

"Dell EMC Unity: Virtualization Integration," Technical White Paper, Oct. 2019, 39 pages.

Dell EMC, "Dell EMC PowerMax: ISCSI Implementation for Dell EMC Storage Arrays Running PowerMaxOS," Technical White Paper, Sep. 2019, 35 pages.

U.S. Appl. No. 16/710,828 filed in the name of Vinay G. Rao et al. on Nov. 27, 2019, and entitled "Automated Seamless Migration of Logical Storage Devices."

U.S. Appl. No. 16/710,828 filed in the name of Amit Pundalik Anchi et al. on Dec. 11, 2019, and entitled "Automated Seamless Migration with Signature Issue Resolution."

* cited by examiner

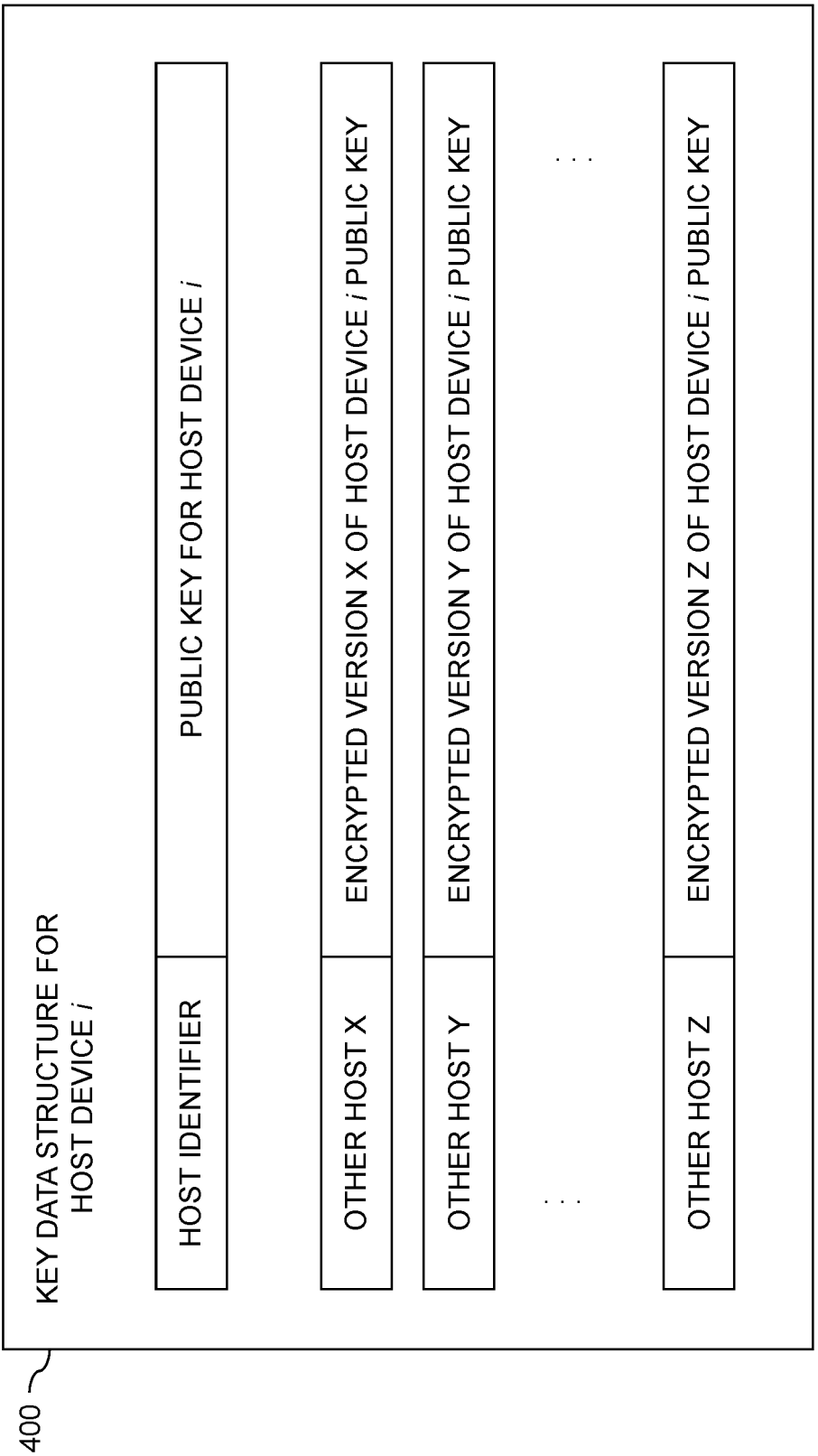

LOGICAL STORAGE DEVICE ACCESS IN AN ENCRYPTED STORAGE ENVIRONMENT

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations directed to particular logical storage volumes or other logical storage devices, for delivery by the host devices over selected paths to storage ports of the storage system. Different ones of the host devices can run different applications with varying workloads and associated IO patterns. Such host devices also generate additional IO operations in performing various data services such as migration and replication. Various types of storage access protocols can be used by host devices to access the logical storage volumes or other logical storage devices of the storage system, including by way of example Small Computer System Interface (SCSI) access protocols and Non-Volatile Memory Express (NVMe) access protocols.

SUMMARY

Illustrative embodiments provide techniques for logical storage device access in an encrypted storage environment. For example, some embodiments are configured to facilitate management of snapshots or other copies of logical storage volumes or other logical storage devices in a storage environment in which data of the logical storage devices is encrypted, thereby improving IO processing performance. These and other embodiments advantageously allow each of a plurality of host devices to access encrypted data of a snapshot or other copy of a logical storage device in situations in which at least portions of that encrypted data were written by another one of the plurality of host devices, while also maintaining the security of all of the host devices in their respective private keys used to encrypt data.

In some embodiments, such techniques are illustratively provided at least in part utilizing multi-pathing software associated with a multi-path layer of the one or more host devices. For example, at least portions of the disclosed functionality can be managed in some embodiments by a host driver, such as a multi-path input-output (MPIO) driver, in conjunction with processing of IO operations. The MPIO driver is illustratively part of a multi-path layer that is configured to process IO operations of at least one host device that communicates with one or more storage arrays or other types of storage systems. Other types of host drivers or other host device components can be used in place of or in addition to one or more MPIO drivers.

In one embodiment, an apparatus comprises at least one processing device that includes a processor and a memory, with the processor being coupled to the memory. The at least one processing device is configured to associate a first logical storage device of a storage system with a first host device, wherein data encrypted using a private key of the first host device is written to the first logical storage device, to generate a copy of the first logical storage device in the storage system, and to associate the copy of the first logical storage device with a second logical storage device of the storage system, wherein data encrypted using a private key of a second host device is written to the second logical storage device. The at least one processing device is further configured to provide the second host device with access to an encrypted version of a public key of the first host device, encrypted using a public key of the second host device, to allow the second host device to obtain therefrom the public key of the first host device, so that the second host device can access particular data of the second logical storage device that was written using the private key of the first host device.

The at least one processing device illustratively comprises at least a portion of the storage system shared by the first and second host devices. Other embodiments can include more than two host devices, with each such host device implementing similar functionality. In some embodiments, each of the host devices comprises at least one MPIO driver configured to control delivery of IO operations to storage devices of the storage system over selected ones of a plurality of paths through a network.

In some embodiments, responsive to a request from the second host device for particular data of the second logical storage device, the at least one processing device is further configured to determine if the particular data was encrypted using the private key of the first host device or the private key of the second host device, and to provide the second host device with the particular data and an indication of a result of the determination.

If the result of the determination is that the particular data was encrypted using the private key of the first host device, the indication illustratively directs the second host device to decrypt the particular data using the public key of the first host device, which is obtained by the second host device decrypting the encrypted version of the public key of the first host device using the private key of the second host device.

If the result of the determination is that the particular data was encrypted using the private key of the second host device, the indication illustratively directs the second host device to decrypt the particular data using the public key of the second host device.

In some embodiments, the at least one processing device is illustratively configured to store the public key of the first host device for use in decrypting encrypted data written by the first host device to the first logical storage device, and to store the public key of the second host device for use in decrypting encrypted data written by the second host device to the second logical storage device.

In some embodiments, providing the second host device with access to an encrypted version of a public key of the first host device illustratively comprises providing the encrypted version of the public key of the first host device to the second host device in response to a command received from the second host device. For example, the command illustratively comprises a vendor unique command of a storage access protocol utilized by the first and second host devices to access the storage system over a network, although a wide variety of other types of commands could be used.

The command in some embodiments is received in the storage system from an MPIO driver of the second host device. The encrypted version of the public key of the first host device is illustratively decrypted, using the private key of the second host device, to obtain the public key of the first host device, with such operations being performed in a kernel-space portion of the MPIO driver of the second host device.

In some embodiments, the indication of the result of the determination comprises a check condition notification sent by the storage system to the second host device to direct the second host device to decrypt the particular data using the public key of the first host device, or to decrypt the particular data using the public key of the second host device.

As another example, the indication of the result of the determination illustratively comprises a status value sent by the storage system to the second host device to direct the second host device to decrypt the particular data using the public key of the first host device, or to decrypt the particular data using the public key of the second host device. Other types of indications can be used in other embodiments.

These and other illustrative embodiments include, without limitation, apparatus, systems, methods and computer program products comprising processor-readable storage media.

BRIEF DESCRIPTION OF THE DRAWINGS

FIG. 4 shows an example data structure utilized in implementing logical storage device access in an encrypted storage environment in an illustrative embodiment.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
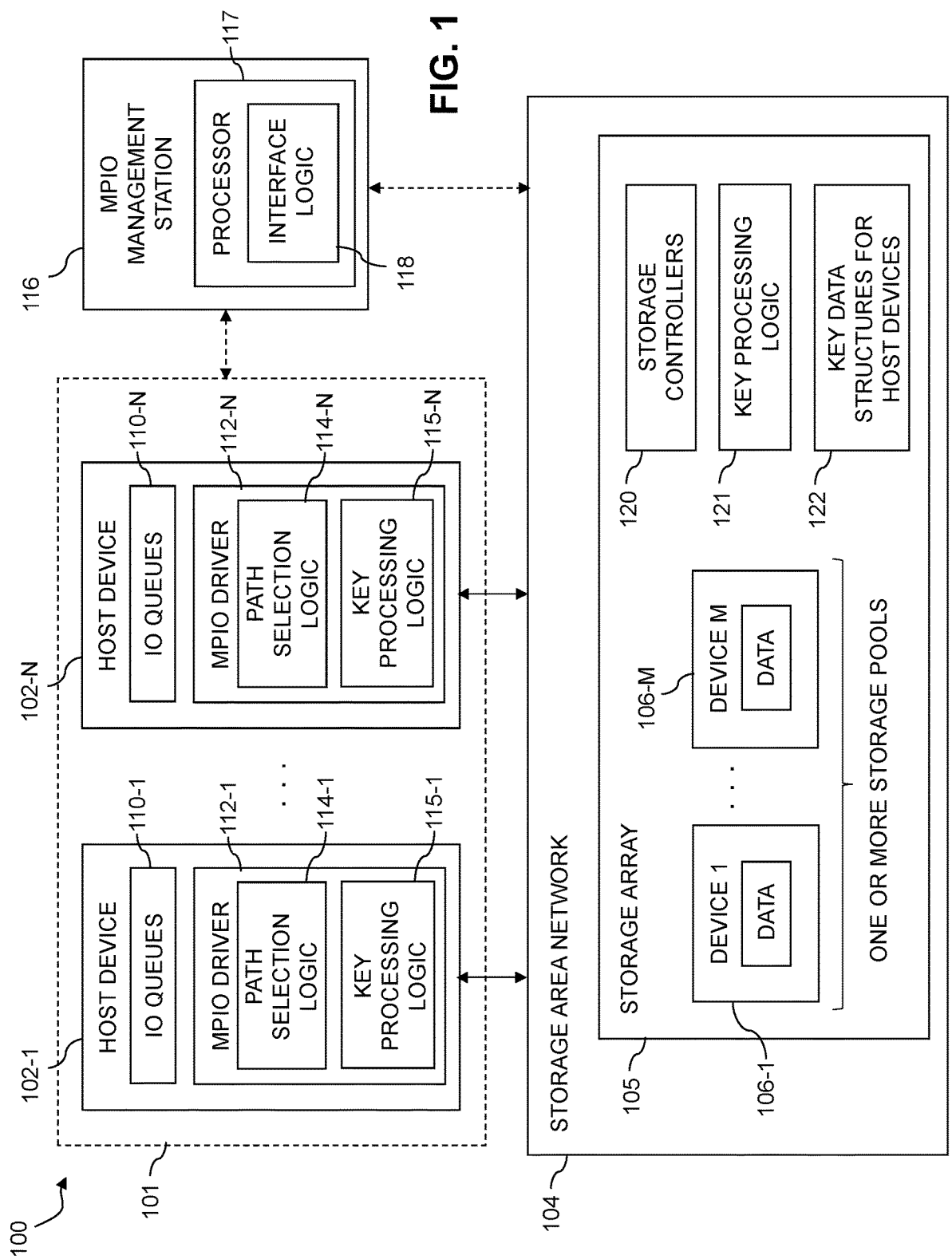
FIG. 1 is a block diagram of an information processing system configured with functionality for logical storage device access in an encrypted storage environment in an illustrative embodiment.

FIG. 1 shows an information processing system 100 configured in accordance with an illustrative embodiment. The information processing system 100 comprises a computer system 101 illustratively comprising a plurality of host devices 102-1, . . . 102-N, where N is an integer greater than or equal to two. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102, where M is also an integer greater than or equal to two. The storage devices 106 are illustratively arranged in one or more storage pools.

The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 over the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands of a SCSI access protocol and/or Non-Volatile Memory Express (NVMe) commands of an NVMe access protocol, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand (IB), Gigabit Ethernet or Fibre Channel (FC). Numerous alternative networking arrangements are possible in a given embodiment, as will be appreciated by those skilled in the art.

The host devices 102 comprise respective sets of IO queues 110-1, . . . 110-N and respective MPIO drivers 112-1, . . . 112-N. The MPIO drivers 112 collectively comprise a multi-path layer of the host devices 102. Path selection functionality for delivery of IO operations from the host devices 102 to the storage array 105 is provided in the multi-path layer by respective instances of path selection logic 114-1, . . . 114-N implemented within the MPIO drivers 112. The multi-path layer further provides functionality for logical storage device access in an encrypted storage environment as disclosed herein. Such functionality is provided at least in part using respective instances of key processing logic 115-1, . . . 115-N implemented within the MPIO drivers 112.

The MPIO drivers 112 may comprise, for example, otherwise conventional MPIO drivers, such as PowerPath® drivers from Dell Technologies, suitably modified in the manner disclosed herein to provide functionality for logical storage device access in an encrypted storage environment. Other types of MPIO drivers from other driver vendors may be suitably modified to incorporate functionality for logical storage device access as disclosed herein.

The host devices 102 can include additional or alternative components. For example, in some embodiments, the host devices 102 comprise respective local caches, implemented using respective memories of those host devices. A given such local cache can be implemented using one or more cache cards, possibly implementing caching techniques such as those disclosed in U.S. Pat. Nos. 9,201,803, 9,430,368 and 9,672,160, each entitled "System and Method for Caching Data," and incorporated by reference herein. A wide variety of different caching techniques can be used in other embodiments, as will be appreciated by those skilled in the art. Other examples of memories of the respective host devices 102 that may be utilized to provide local caches include one or more memory cards or other memory devices, such as, for example, an NVMe over PCIe cache card, a local flash drive or other type of NVM storage drive, or combinations of these and other host memory devices.

The system 100 further comprises an MPIO management station 116 that includes a processor 117 implementing interface logic 118. The interface logic 118 is utilized to communicate with the host devices 102 and the storage array 105. Such an MPIO management station 116 provides management functionality for the multi-path layer comprising the MPIO drivers 112 of the host devices 102. In some embodiments, host device management software executing on the MPIO management station 116 interacts with storage array management software executing on the storage array 105. The MPIO management station 116, or portions thereof, may be considered in some embodiments as forming part of what is referred to herein as a "multi-path layer" that includes the MPIO drivers 112 of the host devices 102. The term "multi-path layer" as used herein is intended to be broadly construed and may comprise, for example, an MPIO layer or other multi-path software layer of a software stack, or more generally multi-pathing software program code, running on one or more processing devices each comprising at least one processor and at least one memory.

The MPIO management station 116 is an example of what is more generally referred to herein as an "external server" relative to the storage array 105. Additional or alternative external servers of different types can be used in other embodiments. In some embodiments, one or more external servers, such as the MPIO management station 116, perform at least a portion of the logical storage device access functionality disclosed herein, illustratively in cooperation with the storage array 105 and the instances of key processing logic 115 of the respective MPIO drivers 112.

The MPIO driver 112-1 is configured to deliver IO operations selected from its corresponding set of IO queues 110-1 to the storage array 105 via selected ones of multiple paths over the SAN 104. The sources of the IO operations stored in the set of IO queues 110-1 illustratively include respective processes of one or more applications executing on the host device 102-1. For example, IO operations can be generated by each of multiple processes of a database application running on the host device 102-1. Such processes issue IO operations for delivery to the storage array 105 over the SAN 104. Other types of sources of IO operations may be present in a given implementation of system 100.

A given IO operation is therefore illustratively generated by a process of an application running on the host device 102-1, and is queued in a given one of the IO queues 110-1 of the host device 102-1 with other operations generated by other processes of that application, and possibly other processes of other applications.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value. A negotiated link speed is an example of what is more generally referred to herein as a "negotiated rate."

The negotiated rates of the respective initiator and target of a particular one of the paths illustratively comprise respective negotiated data rates determined by execution of at least one link negotiation protocol for that path. The link negotiation protocol is illustratively performed separately by the initiator and the target, and involves each such component separately interacting with at least one switch of a switch fabric of the network 104 in order to determine the negotiated rate. The term "negotiated rate" therefore illustratively comprises a rate negotiated between an initiator or a target and a switch of a switch fabric of network 104. However, the term "negotiated rate" as used herein is intended to be broadly construed so as to also encompass, for example, arrangements that refer to negotiated speeds. Any of a wide variety of different link negotiation protocols can be used, including auto-negotiation protocols, as will be readily appreciated by those skilled in the art.

For example, some embodiments are configured to utilize link negotiation protocols that allow negotiation of data rates such as 1 G, 2 G, 4 G, 8 G, 16 G, 32 G, etc., where G denotes Gigabits per second (Gb/sec). The link bandwidth is illustratively specified in terms of Megabytes per second (MB/sec), and the actual amount of data that can be sent over the link in practice is typically somewhat lower than the negotiated data rate. Accordingly, a negotiated rate of 1 G in some systems may correspond to an actual achievable data rate that is lower than 100 MB/sec, such as a rate of 85 MB/sec.

The term "negotiated rate" as used herein is therefore intended to be broadly construed, so as to encompass, for example, a theoretical negotiated rate or an actual achievable data rate that corresponds to the theoretical negotiated rate within a given system.

It is also to be appreciated that a wide variety of other types of rate negotiation may be performed in other embodiments.

Various scheduling algorithms, load balancing algorithms and/or other types of algorithms can be utilized by the MPIO driver 112-1 in delivering IO operations from the IO queues 110-1 to the storage array 105 over particular paths via the SAN 104. Each such IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105. Examples of such HBAs and storage array ports are illustrated in conjunction with the embodiment of FIG. 3.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 112-1, to determine if zoning and masking information has been changed. The predetermined command can comprise, for example, a log sense command, a mode sense command, a "vendor unique" or VU command, or combinations of multiple instances of these or other commands, in an otherwise standardized command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible. The user-space portion of the MPIO driver 112-1 is illustratively associated with an Operating System (OS) kernel of the host device 102-1. Other MPIO driver arrangements are possible. For example, in some embodiments, an MPIO driver may be configured using a kernel-based implementation, and in such an arrangement may include only a kernel-space portion and no user-space portion.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

The MPIO management station 116 is arranged as an intermediary device relative to the host devices 102 and the storage array 105. Some communications between the host devices 102 and the storage array 105 can occur via such an intermediary device, which as indicated elsewhere herein can alternatively comprise one or more external servers. Such communications illustratively involve utilization of an out-of-band communication mechanism, such as one or more IP connections between the host devices 102 and the MPIO management station 116.

As indicated previously, the host devices 102 communicate directly with the storage array 105 using one or more storage access protocols such as SCSI, Internet SCSI (iSCSI), SCSI over FC (SCSI-FC), NVMe over FC (NVMe/FC), NVMe over Fabrics (NVMeF), NVMe over TCP (NVMe/TCP), and/or others. The MPIO management station 116 in some embodiments is similarly configured to communicate directly with the storage array 105 using one or more such storage access protocols.

The MPIO driver 112-1 on the host device 102-1 illustratively has connectivity to the MPIO management station 116. The MPIO management station 116 in some embodiments implements PowerPath® Management Appliance (PPMA) functionality to obtain access to the storage array 105. The MPIO driver 112-1 can obtain from the MPIO management station 116 certain types of storage array related information for use in various operations performed at least in part by the MPIO driver 112-1, in addition to or in place of obtaining such information directly from the storage array 105. Host multi-pathing software can be used to implement a multi-path layer comprising MPIO drivers 112 of respective host devices 102 as well as related management appliance software such as the above-noted PPMA of MPIO management station 116. Such host multi-pathing software can be configured to facilitate logical storage device access in an encrypted storage environment as disclosed herein. For example, multi-pathing software residing on one or more of the host devices 102 (e.g., a server such as an ESXi server or an AIX server) is utilized in illustrative embodiments to support logical storage device access in an encrypted storage environment.

In the FIG. 1 embodiment, the storage array 105 comprises a plurality of storage controllers 120, key processing logic 121, and corresponding key data structures 122 for respective ones of the host devices 102. In other embodiments, one or more of the key processing logic 121 and the corresponding key data structures 122 can be implemented at least in part external to the storage array 105 rather than internal to the storage array 105. For example, in some embodiments at least portions of the key processing logic 121 and corresponding key data structures 122 are implemented on one or more servers that are external to the storage array 105, such as in the MPIO management station 116 or in another type of external server.

Accordingly, such logic components and related stored information may be located internal to the storage array 105, external to the storage array 105, or implemented in part internally and in part externally to the storage array 105, and can include various combinations of hardware, firmware and software. The term "logic" as used herein is therefore intended to be broadly construed.

As indicated above, at least portions of the communications between the host devices 102 and the storage array 105 can utilize an in-band communication mechanism in which one or more predetermined commands in a designated storage access protocol are sent from the host device 102-1 to the storage array 105. Such predetermined commands can comprise, for example, read and/or write commands, sense commands (e.g., log sense and/or mode sense commands), "vendor unique" or VU commands, or combinations of multiple instances of these or other commands, in an otherwise standardized command format, such as a SCSI format, an NVMe format, or other type of format. A "command" as the term is broadly used herein can comprise a combination of multiple distinct commands.

It is also possible for the host devices 102 and the storage array 105 to communicate via one or more out-of-band communication mechanisms. For example, an out-of-band communication mechanism of this type can involve host management software of the host device 102-1 communicating with storage array management software of the storage array 105 over an IP network connection or other type of network connection. Such host management software can include software running on the MPIO management station 116, in addition to or in place of software running on the individual host devices 102.

Additional components not explicitly shown in the figure, such as one or more storage caches, may also be provided in the storage array 105 for use in processing IO operations.

For example, in some embodiments, each of the storage controllers 120 has a different local cache or a different allocated portion of a global cache associated therewith, although numerous alternative arrangements are possible. The storage controllers 120 can be implemented as respective storage processors, directors or other storage system components configured to control storage system operations relating to processing of IO operations.

As indicated above, illustrative embodiments overcome various drawbacks of conventional practice by configuring the system 100 to include functionality for logical storage device access in an encrypted storage environment, as will now be described in more detail.

In operation, the MPIO driver 112-1 is configured to control delivery of IO operations from its corresponding host device 102-1 to storage array 105 over selected ones of a plurality of paths through SAN 104, wherein the paths are associated with respective initiator-target pairs, the initiators being implemented on the host device 102-1 and the targets being implemented on the storage array 105.

The paths over which IO operations are delivered from the host device 102-1 to the storage array 105 under the control of the MPIO driver 112-1 are assumed to be associated with respective initiator-target pairs, with the initiators of the initiator-target pairs illustratively comprising respective HBAs of the host device 102-1 and the targets of the initiator-target pairs illustratively comprising respective storage array ports of the storage array 105. Other types of paths involving other types of initiators and targets can be used in other embodiments.

The other MPIO drivers 112 of the other host devices 102 are assumed to operate in a similar manner as that described above for MPIO driver 112-1 of host device 102-1.

Each of the host devices 102 is an example of what is more generally referred to herein as "at least one processing device" comprising a processor and a memory, with the processor being coupled to the memory.

Similarly, the storage array 105, or portions thereof, is an example of "at least one processing device" comprising a processor and a memory.

The storage array 105 in some embodiments implements functionality for facilitating access of host devices 102 to encrypted logical storage devices of an encrypted storage environment in the following manner.

The storage array 105 is illustratively configured to associate a first logical storage device of the storage array 105 with a first one of the host devices 102, such as host device 102-1. It is assumed that each of the host devices 102 has a corresponding private-public key pair. Accordingly, data encrypted using a private key of the first host device 102-1 is written to the first logical storage device in the storage array 105. The storage array 105 generates a snapshot or other copy of the first logical storage device in the storage array 105, and associates the copy of the first logical storage device with a second logical storage device of the storage array 105. Data encrypted using a private key of a second one of the host devices 102, such as host device 102-2, is written to the second logical storage device.

Such an arrangement is an example of what is more generally referred to herein as an "encrypted storage environment," although other types of encrypted storage environments can be used in other embodiments.

In cases in which the copy is a snapshot of the first logical storage device, such a snapshot illustratively only copies changed data of the first logical storage device rather than all data of the first logical storage device. For such cases, the storage array 105 illustratively tracks changed blocks of the first logical storage device utilizing a changed block bitmap or other similar data structure. Other types of snapshots or copies of logical storage devices can be used in other embodiments.

Also, the disclosed techniques can be readily extended to a chain of snapshots or other copies. Thus, for example, a snapshot of a snapshot may be generated in some embodiments, and so on for one or more additional iterations illustratively associated with respective additional levels of indirection, with access to each of the resulting logical storage devices being providing using the techniques disclosed herein.

The term "public key" in the context of a private-public key pair of a given one of the host devices is intended to be broadly construed, but should not be viewed as requiring an arrangement in which the public key is available to the public or otherwise widely available. For example, in some embodiments, the given host device keeps its private key secret within that host device, but makes its public key available to the storage array 105 and possibly to one or more other host devices 102 of the system 100 in a manner to be described in greater detail below. Such a public key is generally not made available to any other entities, such as entities outside of the system 100. Accordingly, the term "public key" as used herein refers to a key of a private-public key pair that is not kept secret within the host device, like the corresponding private key, but is instead shared with at least the storage array 105.

It should also be noted that the first and second host devices as those terms are broadly used herein can be any pair of the N host devices 102 in the FIG. 1 embodiment, although the first and second host devices are assumed without limitation to be respective host devices 102-1 and 102-2. The same or similar techniques can be implemented for any other pair of the host devices 102, as well as for groups of more than two of the host devices 102.

In an arrangement of the type described above, the second logical storage device illustratively contains encrypted data written by different ones of the host devices 102 using their respective private keys. However, this type of arrangement is problematic, in that the second host device 102-2, which is using an encrypted logical storage device initiated as a copy of another logical storage device containing data encrypted by the first host device 102-1, generally cannot access that encrypted data without having access to one or more keys of the first host device 102-1. These and other drawbacks of such arrangements are advantageously overcome in illustrative embodiments disclosed herein.

For example, in some embodiments, the storage array 105 is configured to provide the second host device 102-2 with access to an encrypted version of a public key of the first host device 102-1, encrypted using a public key of the second host device 102-2. This allows the second host device 102-2 to obtain the public key of the first host device 102-1, illustratively by decrypting the encrypted version of the public key of the first host device 102-1, so that the second host device 102-2 can access particular data of the second logical storage device that was written using the private key of the first host device 102-1.

As indicated above, other embodiments can include more than two host devices 102, with each such host device implementing similar functionality. Thus, references to the first and second host devices 102-1 and 102-2 are presented by way of illustrative example only.

The storage array 105 illustratively stores the above-noted encrypted version of the public key of the first host device 102-1 in one of the key data structures 122 that it maintains for the host devices 102. An example of such a data structure will be described below in conjunction with FIG. 4.

The key data structures 122 are also used to store additional keys. For example, in some embodiments, the storage array 105 is illustratively configured to store the public key of the first host device 102-1 for use in decrypting encrypted data written by the first host device 102-1 to the first logical storage device, and to store the public key of the second host device 102-2 for use in decrypting encrypted data written by the second host device 102-2 to the second logical storage device.

In some embodiments, responsive to a request from the second host device 102-2 for particular data of the second logical storage device, the storage array 105 is further configured to determine if the particular data was encrypted using the private key of the first host device 102-1 or the private key of the second host device 102-2, and to provide the second host device 102-2 with the particular data and an indication of a result of the determination. The request illustratively comprises a read request sent to the storage array 105 by the MPIO driver 112-2 of the second host device 102-2.

For example, if the result of the above-noted determination made by the storage array 105 is that the particular data was encrypted using the private key of the first host device 102-1, the indication illustratively directs the second host device 102-2 to decrypt the particular data using the public key of the first host device 102-1, which is obtained by the second host device 102-2 decrypting the encrypted version of the public key of the first host device 102-1 using the private key of the second host device 102-2.

Alternatively, if the result of the determination made by the storage array 105 is that the particular data was encrypted using the private key of the second host device 102-2, the indication illustratively directs the second host device 102-2 to decrypt the particular data using the public key of the second host device 102-2.

It should be noted that terms such as "indication" and "direct" are intended to be broadly construed, and should not be viewed as limited to particular formats. For example, an indication need not explicitly specify use of a particular key, but can instead be implemented as a binary indicator that when provided by the storage array 105 to one of the host devices 102, is viewed by that host device as a direction to utilize a particular one of a plurality of possible keys to decrypt the particular encrypted data. In these and other arrangements, the direction conveyed by the indication can therefore be implicit, rather than an explicit instruction or other command for the host device to utilize a particular key.

In some embodiments, providing the second host device 102-2 with access to an encrypted version of a public key of the first host device 102-1 illustratively comprises providing the encrypted version of the public key of the first host device 102-1 to the second host device 102-2 in response to a command received from the second host device 102-2. For example, the command illustratively comprises a VU command of a storage access protocol utilized by the first host device 102-1 and the second host device 102-2 to access the storage array 105 over a network, such as a SCSI or NVMe access protocol, although a wide variety of other types of commands, including non-VU commands and various combinations of one or more VU commands and/or one or more non-VU commands, could be used.

The command in some embodiments is received in the storage array 105 from an MPIO driver 112-2 of the second host device 102-2. The encrypted version of the public key of the first host device 102-1 is illustratively decrypted, using the private key of the second host device 102-2, to obtain the public key of the first host device 102-1, with such operations being performed in a kernel-space portion of the MPIO driver 112-2 of the second host device 102-2.

In some embodiments, the indication of the result of the determination comprises a check condition ("chk_cond") notification sent by the storage array 105 to the second host device 102-2 to direct the second host device 102-2 to decrypt the particular data using the public key of the first host device 102-1, or to decrypt the particular data using the public key of the second host device 102-2. Such a check condition notification in some embodiments more particularly comprises a VU check condition notification of a SCSI-FC access protocol.

As another example, the indication of the result of the determination illustratively comprises a status value sent by the storage array 105 to the second host device 102-2 to direct the second host device 102-2 to decrypt the particular data using the public key of the first host device 102-1, or to decrypt the particular data using the public key of the second host device 102-2. Such a status value in some embodiments more particularly comprises a VU status value of an NVMeF access protocol.

A wide variety of other types of check condition notifications, status values, or other information transmission arrangements can be used to convey the above-noted indication of the result of the determination from the storage array 105 to the second host device 102-2 in other embodiments.

As noted above, operations described herein as being performed by the MPIO driver 112-1 utilizing its path selection logic 114-1 and key processing logic 115-1 can be similarly performed in other ones of the MPIO drivers 112 of other ones of the host devices 102. Additionally or alternatively, one or more of the above-described operations in other embodiments can be performed utilizing one or more other components of the host devices 102 and/or the storage array 105.

An example of a process including logical storage device access operations of the type outlined above will be described below in conjunction with the flow diagram of FIG. 2. These and other operations referred to herein as being performed by one or more host devices operating in conjunction with one or more storage arrays of a storage system can in other embodiments involve additional or alternative system components, possibly including one or more external servers such as MPIO management station 116.

As indicated previously, the initiators of the initiator-target pairs illustratively comprise respective HBAs of the host device 102-1 and the targets of the initiator-target pairs comprise respective storage array ports of the storage array 105.

Negotiated rates of the respective particular initiator and the corresponding target illustratively comprise respective negotiated data rates determined by execution of at least one link negotiation protocol for an associated one of the paths.

In some embodiments, at least a portion of the initiators comprise virtual initiators, such as, for example, respective ones of a plurality of N-Port ID Virtualization (NPIV) initiators associated with one or more Fibre Channel (FC) network connections. Such initiators illustratively utilize NVMe arrangements such as NVMe/FC, although other protocols can be used. Other embodiments can utilize other types of virtual initiators in which multiple network addresses can be supported by a single network interface, such as, for example, multiple media access control (MAC)

addresses on a single network interface of an Ethernet network interface card (NIC). Accordingly, in some embodiments, the multiple virtual initiators are identified by respective ones of a plurality of media MAC addresses of a single network interface of a NIC. Such initiators illustratively utilize NVMe arrangements such as NVMe/TCP, although again other protocols can be used.

In some embodiments, the NPIV feature of FC allows a single host HBA port to expose multiple World Wide Numbers (WWNs) to the SAN 104 and the storage array 105. A WWN or World Wide Identifier (WWID) is a unique identifier used in various types of storage technologies that may be implemented in illustrative embodiments herein, including, for example, SCSI, NVMe, FC, Parallel Advanced Technology Attachment (PATA), Serial Advanced Technology Attachment (SATA), Serial Attached SCSI (SAS) and others, and may be viewed as an example of what is more generally referred to herein as a virtual identifier. The NPIV feature is used, for example, when there are multiple IO producers on a given host device with a need to distinguish which IO is related to which producer.

One such case is a system involving virtual machines (VMs), where multiple VMs run on a single ESXi server with HBAs. All VMs are using all HBAs but there is a need to be able to distinguish which IO belongs to which VM, for example, in order to implement service level objectives (SLOs) between the various VMs, illustratively at an OS level. Each of the NPIV initiators behaves as if it is a "normal" or physical initiator, in that it logs into a storage array port, requires masking, etc. Another example of NPIV usage is in the context of AIX servers, where different logical partitions each use a different NPIV initiator over the same host HBA port.

Accordingly, in some embodiments, the multiple virtual initiators are associated with a single HBA of the host device 102-1 but have respective unique identifiers associated therewith.

Additionally or alternatively, different ones of the multiple virtual initiators are illustratively associated with respective different ones of a plurality of virtual machines of the host device that share a single HBA of the host device, or a plurality of logical partitions of the host device that share a single HBA of the host device.

Again, numerous alternative virtual initiator arrangements are possible, as will be apparent to those skilled in the art. The term "virtual initiator" as used herein is therefore intended to be broadly construed. It is also to be appreciated that other embodiments need not utilize any virtual initiators. References herein to the term "initiators" are intended to be broadly construed, and should therefore be understood to encompass physical initiators, virtual initiators, or combinations of both physical and virtual initiators.

As disclosed herein, aspects of logical storage device access in an encrypted storage environment are illustratively performed by each of the instances of key processing logic 115 in respective ones of the MPIO drivers 112 of the multi-path layer. However, it is to be appreciated that additional or alternative components such as MPIO management station 116 can participate in one or more operations relating to logical storage device access in other embodiments. Terms such as "logical storage device access" and "key processing" as used herein are intended to be broadly construed, so as to encompass a wide variety of additional or alternative arrangements for facilitating access to encrypted logical storage devices, including snapshots or other copies, from one or more host devices.

These and other illustrative embodiments disclosed herein provide functionality for logical storage device access in an encrypted storage environment, with at least portions of that functionality being implemented using one or more MPIO drivers of a multi-path layer of at least one host device. The MPIO drivers can comprise PowerPath® drivers suitably modified to implement the techniques disclosed herein. Other types of host multi-pathing software from other vendors can be similarly modified to implement the techniques disclosed herein. Again, MPIO drivers are not required, and other types of host drivers or more generally other host device components can be used.

As described above, in illustrative embodiments disclosed herein, the host devices 102 are configured to interact with storage array 105 in a manner that provides enhanced logical storage device access in an encrypted storage environment comprising host devices 102 and storage array 105.

A more detailed example of an algorithm involving at least first and second ones of the host devices 102 utilizing their respective MPIO drivers and their respective corresponding instances of path selection logic 114 and key processing logic 115 will now be described. Such components are configured to interact with the storage array 105 which implements portions of the disclosed functionality within what is generally referred to herein as an "encrypted storage environment."

In some embodiments, an encrypted storage environment is part of an end-to-end encryption arrangement, in which application data is encrypted in a host device ("host") and sent encrypted to a storage array, also referred to herein as simply an "array." In some implementations of this type, the array does not have the encryption keys, and instead just saves the encrypted data. In other implementations, the array has the encryption keys, and it decrypts the data to allow compression and deduplication, and then may encrypt the compressed and deduplicated data before saving it to persistent storage, illustratively referred to below as "disk" but not limited to any particular type of storage medium.

In such a storage environment with end-to-end encryption, where data of one or more logical storage volumes or other logical storage devices is saved in encrypted form to disk, problems can arise when using snapshots ("snaps") or other copies of the encrypted logical storage devices. For example, when a snap of a source logical storage device ("source device") is created, the snap data is illustratively made visible to the host via a different logical storage device, such as a PowerMax™ logical storage device linked to the snap. The host accessing the snap data must have the keys associated with the source device in order to decrypt the data. This means the source device keys must be made available to any host using copies of the source device.

This problem is exacerbated in cases where each device, or group of devices, associated with a particular application must have its own unique key in order to ensure proper application data security. In such a case, different hosts accessing the copies of the source device data, via different devices, will have to have the application keys in order to use the data, thus working against the policy where each device, or group of devices, must have a unique key.

In some embodiments, it is assumed that the array has keys allowing it to decrypt data arriving from any host, so as to allow performance of compression and deduplication operations on the data, and that the compressed and deduplicated data is then stored in encrypted form in the array, although it is to be appreciated that the order in which compression and deduplication are performed can be reversed in other embodiments.

A more particular illustration of the above-described problem in this example context is as follows, assuming two different hosts denoted Host 1 and Host 2, where Host 1 is assumed to be a production host, and two different storage devices denoted Device 1 and Device 2:

1. Host 1 has a private-public key pair comprising private key $K1_{Priv}$ and public key $K1_{Pub}$.

2. Host 1 encrypts data using its private key $K1_{Priv}$ before writing it to Device 1. Therefore Host 1 is writing encrypted data to Device 1 and the data arrives encrypted to the array.

3. Host 1 shares its public key $K1_{Pub}$ with the array thereby allowing the array to decrypt the data for performance of compression and deduplication in the array.

4. A snap is created from Device 1 and linked to Device 2.

5. Host 2 is accessing data of Device 2. Host 2 has a private-public key pair comprising private key $K2_{Priv}$ and public key $K2_{Pub}$.

6. Device 2 contains two types of data:
   (a) Device 1 unchanged data which includes data that was encrypted on Device 1 with the Host 1 private key $K1_{Priv}$.
   (b) Data written to Device 2 by Host 2 encrypted using the Host 2 private key $K2_{Priv}$.

7. Host 2 can't decrypt, from Device 2, the portion of the data encrypted by Host 1 as it doesn't have Host 1 keys.

These and other problems of conventional practice are overcome using techniques disclosed herein.

Host 1 and Host 2 can be any pair of the host devices 102 of the system 100, and the array is assumed to be storage array 105.

Illustrative embodiments configure MPIO drivers of multi-pathing software of a multi-path layer of the host devices 102 to facilitate access to data of logical storage devices corresponding to snaps or other types of copies in encrypted storage environments, such as the above-noted embodiments involving end-to-end encryption.

The above-noted example algorithm for implementing the logical storage device access techniques disclosed herein illustratively includes the following steps, although additional or alternative steps can be used:

1. All operations are illustratively performed in kernel space of respective MPIO drivers of Host 1 and Host 2, to avoid user-space security attacks.

2. Before accessing Device 2 data for the first time:
   (a) The MPIO driver of Host 2 sends to the array the Host 2 public key $K2_{Pub}$ and continues to maintain the Host 2 private key $K2_{Priv}$ in a secure manner.
   (b) The array encrypts the Host 1 public key $K1_{Pub}$ (used to decrypt Device 1 data) using the Host 2 public key $K2_{Pub}$ and stores this encrypted key in a table or other key data structure associated with Device 2.
   (c) The MPIO driver of Host 2 reads or otherwise obtains the encrypted Host 1 public key $K1_{Pub}$ from the array, as encrypted using the Host 2 public key $K2_{Pub}$.
   (d) The MPIO driver of Host 2 decrypts the returned encrypted key to recover $K1_{Pub}$.
   (e) The MPIO driver of Host 2 does not make $K1_{Pub}$ visible to any user, as this processing is performed in kernel space and not in user space.
   (f) The MPIO driver of Host 2 MPIO uses $K1_{Pub}$ to decrypt Device 2 data which originated from Device 1 data.

3. Data read from Device 2 may be one of two types:
   (a) Device 1 data (unchanged data) encrypted with $K1_{Priv}$.
   (b) Data written to Device 2 by Host 2 encrypted with $K2_{Priv}$.

4. The array knows whether the data is unchanged data (encrypted with $K1_{Priv}$) or changed data (encrypted with $K2_{Priv}$).

5. Host 2 will have both $K1_{Pub}$ and $K2_{Pub}$ but Host 2 does not know which key to use to decrypt data read from Device 2 (written data will always be encrypted with $K2_{Priv}$), since the data might be Device 1 data (unchanged data) encrypted with $K1_{Priv}$ or Device 2 written data encrypted with $K2_{Priv}$.

6. When responding to a read command, the array will return the encrypted data it has (encrypted with whatever key) and will:
   (a) For the SCSI-FC protocol, the array will terminate the command with one of two new vendor unique (VU) check condition ("chk_cond") notifications:
      (i) Decrypt with key $K1_{Pub}$ (data originating from Device 1).
      (ii) Decrypt with key $K2_{Pub}$ (data newly written to Device 2).
   (b) For the NVMeF protocol, the array will terminate the command with two new VU status values indicating which of the two keys $K1_{Pub}$ or $K2_{Pub}$ to use to decrypt the returned data.

7. The MPIO driver of Host 2 will now be able to decrypt returned data of Device 2, corresponding to the snap, regardless whether it was written by Host 1 to Device 1 or by Host 2 to Device 2.

This particular algorithm is presented by way of illustrative example only, and other embodiments can use other types of algorithms with additional or alternative steps to provide logical storage device access, such as access to snapshots or other types of copies, in an encrypted storage environment comprising one or more host devices and a storage array or other type of storage system. For example, certain steps illustrated as being performed serially can instead be performed at least in part in parallel with one another. The particular steps of the above-described example algorithm, and other algorithms disclosed herein, are illustrative only, and should not be considered limiting in any way.

Illustrative embodiments herein provide significant advantages over conventional arrangements in which logical storage volumes or other types of logical storage devices are encrypted.

For example, some embodiments are advantageously configured to provide enhanced access to logical storage volumes or other types of logical storage devices in encrypted storage environments, using SCSI access protocols, NVMe access protocols and/or other storage access protocols.

Moreover, illustrative embodiments disclosed herein provide a storage multi-pathing driver supporting snapshots and other types of copies in an encrypted storage environment in an efficient and secure manner.

Some embodiments provide enhanced access to snapshots, copies or other logical storage devices in an encrypted storage environment for a wide variety of different types of host devices and their corresponding storage systems, such as host devices comprising ESXi servers or AIX servers, and the illustrative embodiments can provide significantly improved security in these and other contexts.

Portions of the above-described algorithms and other related techniques and functionality disclosed herein are illustratively implemented by a given MPIO driver on a corresponding host device, and similarly by other MPIO drivers on respective other host devices. Such MPIO drivers illustratively form a multi-path layer or MPIO layer comprising multi-pathing software of the host devices. Other types of multi-pathing software and host drivers can be used in other embodiments. Additionally or alternatively, other host device components can be used to implement at least portions of the disclosed logical storage device access functionality.

Also, ESXi and other host environments referred to herein are used as non-limiting examples only, and the same or similar techniques can be used in a wide variety of other host device environments.

Although VU commands are used in illustrative embodiments herein, other types of commands can be used in other embodiments. For example, various types of log sense, mode sense and/or other "read-like" commands, possibly including one or more commands of a standard storage access protocol such as the above-noted SCSI and NVMe access protocols, can be used in other embodiments.

Additional examples of logical storage device access arrangements will be described elsewhere herein in conjunction with the embodiments of FIGS. 2 through 4. Other types of logical storage device access arrangements can be used in other embodiments.

These and other functions related to logical storage device access that are referred to herein as being performed by or under the control of the MPIO drivers 112 through interaction with the storage array 105 can in some embodiments be performed at least in part outside of MPIO drivers 112 utilizing other system components.

The above-described functions associated with logical storage device access in the MPIO driver 112-1 in some embodiments are carried out at least in part under the control of its key processing logic 115-1, illustratively operating in cooperation with path selection logic 114-1. For example, the key processing logic 115-1 is illustratively configured to control performance of portions of an algorithm comprising one or more steps of the process in the flow diagram to be described below in conjunction with FIG. 2. In other embodiments, one or more such steps can be more generally performed by the host device 102-1.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105. For example, the MPIO drivers 112 of such other host devices are each similarly configured to deliver IO operations from its corresponding one of the sets of IO queues 110 to the storage array 105 over selected paths through the SAN 104, and to perform the disclosed functionality for logical storage device access.

Accordingly, functionality described above in the context of the first MPIO driver 112-1 and the first host device 102-1 is assumed to be similarly performed by each of the other MPIO drivers 112 and/or more generally by their respective host devices 102.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support logical storage device access.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVMe, as described in the NVMe Specification, Revision 1.3, May 2017, which is incorporated by reference herein. Other NVMe storage access protocols of this type that may be utilized in illustrative embodiments disclosed herein include NVMe/FC, NVMeF and NVMe/TCP.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

The storage array 105 in the present embodiment may comprise additional components not explicitly shown in the figure, such as a response time control module and IO operation priority queues, illustratively configured to make use of the above-described persistent memory. For example, the response time control module may be used to implement storage array based adjustments in response time for particular IO operations based at least in part on service level objective (SLO) information stored by the storage array 105 in its persistent memory. The response time control module is assumed to operate in conjunction with the above-noted IO operation priority queues.

The storage array 105 illustratively utilizes its IO operation priority queues to provide different levels of performance for IO operations. For example, the IO operation priority queues may have respective different priority levels. The storage array 105 may be configured to provide different priority levels for different ones of the IO operations by assigning different ones of the IO operations to different ones of the IO operation priority queues. The IO operation priority queues are illustratively associated with respective SLOs for processing of IO operations in the storage array 105. Process tags may be used in assigning different ones of the IO operations to different ones of the IO operation priority queues, as disclosed in U.S. Pat. No. 10,474,367, entitled "Storage System with Input-Output Performance Control Utilizing Application Process Detection," which is incorporated by reference herein.

As mentioned above, communications between the host devices 102 and the storage array 105 may utilize PCIe connections or other types of connections implemented over one or more networks, using interfaces and protocols as previously described. Numerous other interfaces and associated protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage devices 106 of the storage array 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as one or more Unity™ or PowerMax™ storage arrays, commercially available from Dell Technologies.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, and MPIO drivers 112, including their corresponding instances of path selection logic 114 and key processing logic 115, can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 212, and is suitable for use in the system 100 but is more generally applicable to other types of systems comprising two or more host devices and a storage system. The storage system in this embodiment is assumed to comprise at least one storage array having a plurality of storage devices. The storage devices illustratively include logical storage devices such as LUNs or other logical storage volumes that store encrypted data for the host devices in an encrypted storage environment.

Figure 2:
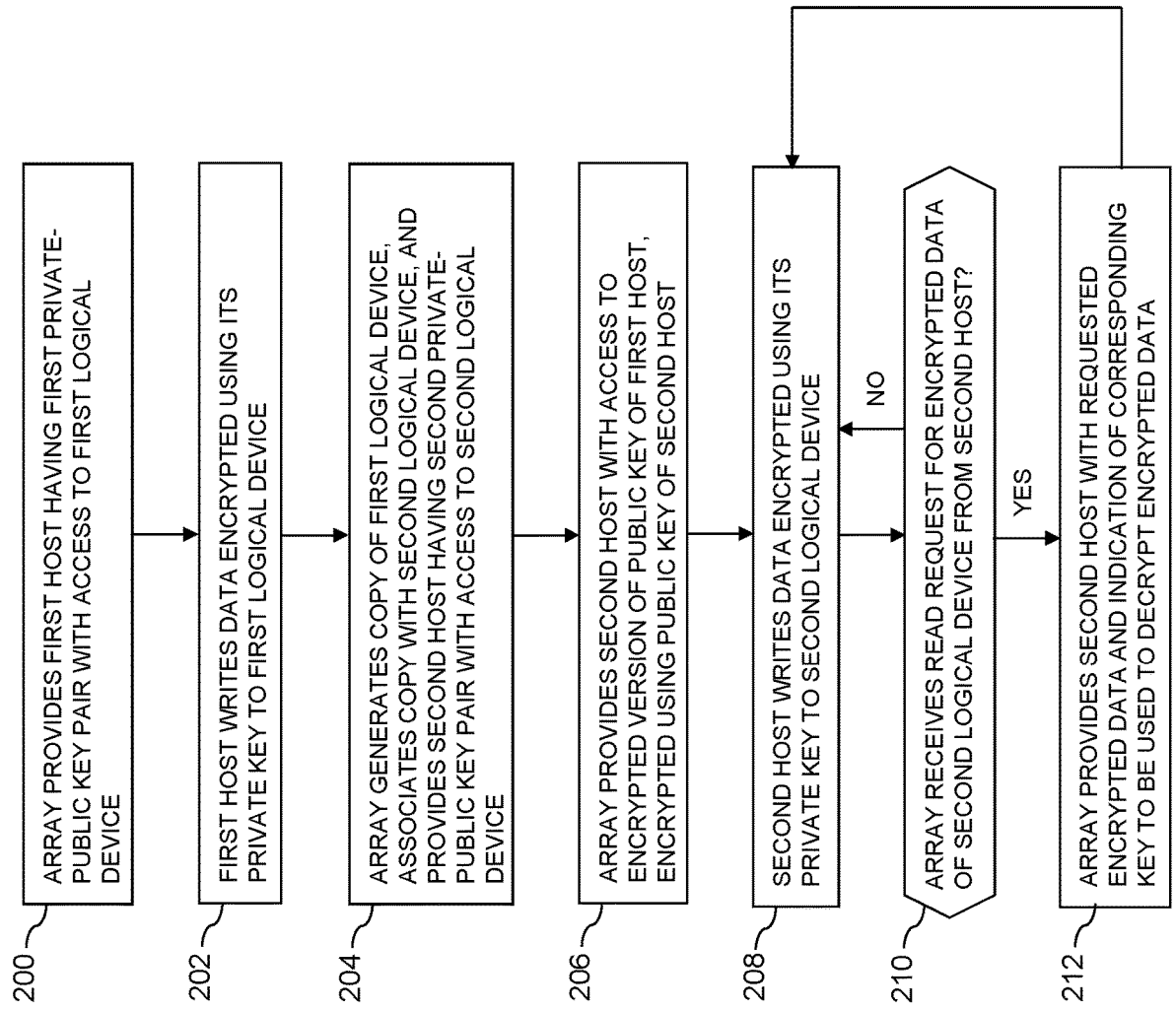
FIG. 2 is a flow diagram of a process for logical storage device access in an encrypted storage environment in an illustrative embodiment.

One or more of the steps of the FIG. 2 process are illustratively performed at least in part by or under the control of first and second host devices, collectively including a multi-path layer comprising one or more MPIO drivers, as well as a storage array or other storage system, and possibly one or more additional components such as an external server comprising an MPIO management station. Other arrangements of additional or alternative system components can be configured to perform at least portions of one or more of the steps of the FIG. 2 process in other embodiments.

The steps shown in FIG. 2 more specifically relate to providing first and second host devices, each referred to in the following description as simply a "host," with enhanced access to encrypted data of one or more logical storage devices of a storage array, referred to in the following description as simply an "array." Similar processes can be implemented for more than two host devices.

In step 200, an array provides a first host having a first private-public key pair with access to a first logical device, such as a LUN or other logical storage volume, each more generally referred to herein as a "logical storage device" or simply a "logical device."

In step 202, the first host writes data encrypted using its private key to the first logical device. Such a write is an example of what is more generally referred to herein as an IO operation. The MPIO driver of the first host illustratively obtains such an IO operation from an application executing on the first host and sends the IO operation from the first host to the array over a selected path. It is assumed in the present embodiment that the MPIO driver of the first host controls the delivery of storage access protocol commands from the first host to the array over selected paths through the SAN.

In step 204, the array generates a copy of the first logical device, associates the copy with a second logical device, and provides a second host having a second private-public key pair with access to the second logical device. The copy is illustratively a snapshot or "snap" of the first logical device, although other types of copies can be used.

In step 206, the array provides the second host with access to an encrypted version of a public key of the first host, illustratively encrypted using a public key of the second host. For example, the array can make the encrypted version of the public key of the first host available to the second host via a "vendor unique" or VU command of a designated storage access protocol, such as a SCSI or NVMe access protocol. Such a VU command is illustratively sent by the second host to the array, and the array responds to the VU command by providing the encrypted version of the public key of the first host.

Other types of commands can additionally or alternatively be used to directly or indirectly convey key information from the array to the second host for use in facilitating access to encrypted logical storage devices in the manner disclosed herein. For example, it is possible in some embodiments that the second host can obtain information from the array via an intervening external server, such as the MPIO management station 116 of FIG. 1. Such an MPIO management station can be considered part of a multi-path layer that includes the MPIO driver. The term "multi-path layer" as used herein is therefore intended to be broadly construed.

In step 208, the second host writes data encrypted using its private key to the second logical device. Again, such a write is an example of what is more generally referred to herein as an IO operation. The MPIO driver of the second host illustratively obtains such an IO operation from an application executing on the second host and sends the IO operation from the second host to the array over a selected path. It is assumed in the present embodiment that the MPIO driver of the second host controls the delivery of storage access protocol commands from the second host to the array over selected paths through the SAN.

In step 210, a determination is made as to whether or not the array has received a read request for encrypted data of the second logical device from the second host. The read request is another example of an IO operation as that term is broadly used herein, and is sent by the MPIO driver of the second host over a selected path to the array. If such a read request for encrypted data has been received by the array, the process moves to step 212, and otherwise returns to step 208 as indicated.

In step 212, which is reached responsive to receipt of a request for encrypted data of the second logical device from the second host, the array provides the second host with the requested encrypted data and an indication of the corresponding key to be used by the second host to decrypt the encrypted data.

For example, responsive to the request from the second host for encrypted data of the second logical device, the array determines if that data was encrypted using the private key of the first host or the private key of the second host, and provides the second host with the encrypted data and an indication of a result of the determination.

If the result of the determination is that the data was encrypted using the private key of the first host, the indication illustratively directs the second host to decrypt the particular data using the public key of the first host, which is obtained by the second host decrypting the encrypted version of the public key of the first host using the private key of the second host.

If the result of the determination is that the particular data was encrypted using the private key of the second host, the indication illustratively directs the second host to decrypt the particular data using the public key of the second host.

The process then returns to step 208 as indicated, at which point the second host illustratively writes additional encrypted data to the second logical device.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and functionality for logical storage device access. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different logical storage device access arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
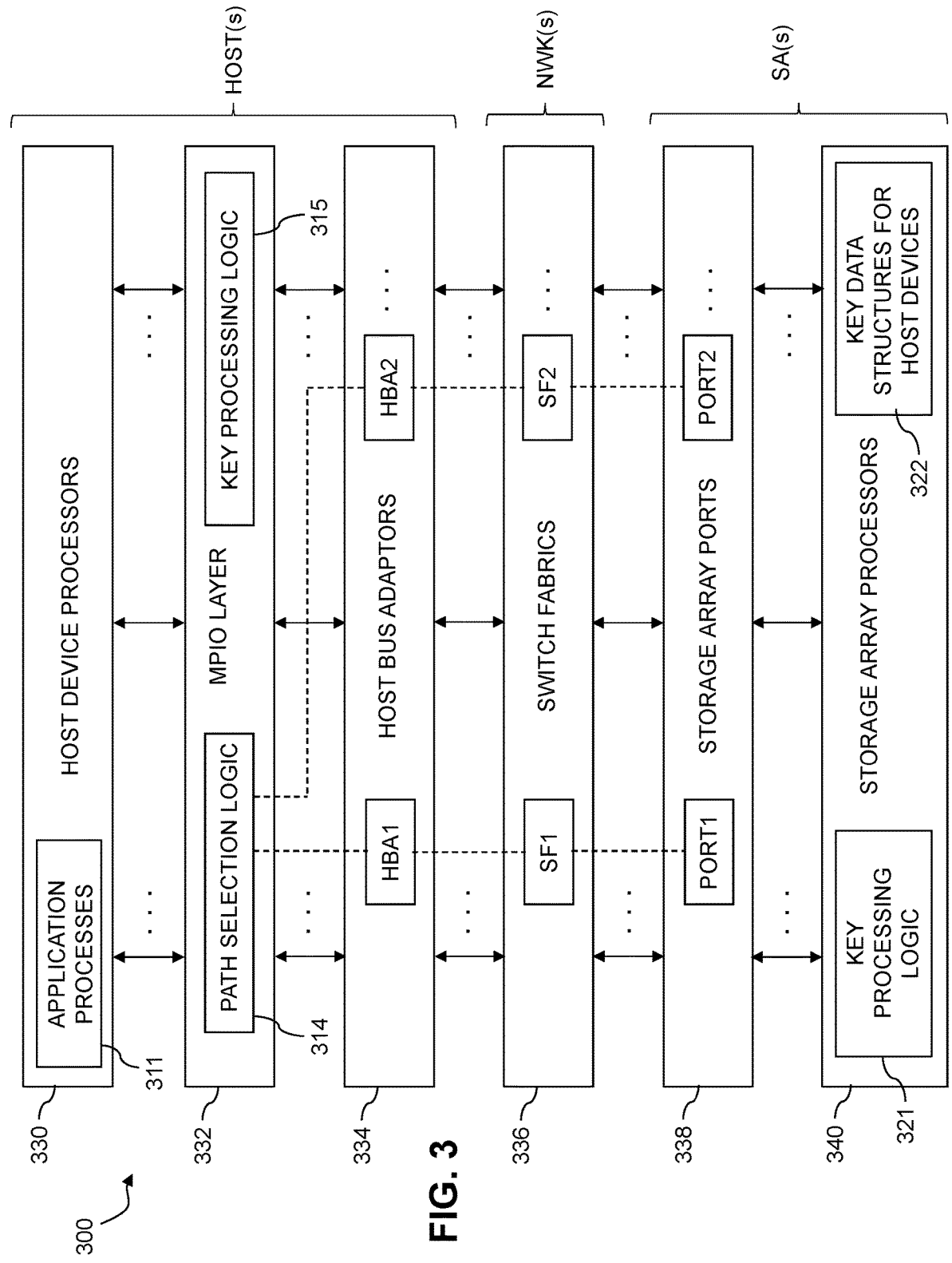
FIG. 3 is a block diagram showing multiple layers of a layered system architecture that incorporates functionality for logical storage device access in an encrypted storage environment in an illustrative embodiment.

Referring now to FIG. 3, another illustrative embodiment is shown. In this embodiment, an information processing system 300 comprises host-side elements that include application processes 311, path selection logic 314 and key processing logic 315, and storage-side elements that include key processing logic 321 and corresponding key data structures 322 for respective host devices. The key data structures 322 in some embodiments each include public keys for one or more host devices and encrypted public keys for one or more other host devices. There may be separate instances of one or more such elements associated with each of a plurality of system components such as host devices and storage arrays of the system 300.

The system 300 is configured in accordance with a layered system architecture that illustratively includes a host device processor layer 330, an MPIO layer 332, an HBA layer 334, a switch fabric layer 336, a storage array port layer 338 and a storage array processor layer 340. The host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs"). The storage array processors of the storage array processor layer 340 may be viewed as corresponding to one or more storage controllers such as the storage controllers 120 of the storage array 105.

The application processes 311 of the host device processor layer 330 generate IO operations that are processed by the MPIO layer 332 for delivery to the one or more storage arrays over the SAN comprising switch fabrics of switch fabric layer 336, using logical storage device access in an encrypted storage environment as disclosed herein. Paths are determined by the path selection logic 314 for sending such IO operations to the one or more storage arrays. These IO operations illustratively involve writing or reading encrypted data from one or more encrypted logical storage devices.

The MPIO layer 332 is an example of what is also referred to herein as a multi-path layer, and comprises one or more MPIO drivers implemented in respective host devices. Each such MPIO driver illustratively comprises respective instances of path selection logic 314 and key processing logic 315 configured as previously described. Additional or alternative layers and logic arrangements can be used in other embodiments.

In a manner similar to that described elsewhere herein, the MPIO layer 332 comprising key processing logic 315 illustratively manages a plurality of IO operations generated by a given host device. The IO operations are sent by the MPIO layer 332 to a storage array over respective paths selected using one or more algorithms implemented by path selection logic 314. Such IO operations include writes of data encrypted by the host devices, which are assumed to comprise at least first and second host devices.

The storage array associates a first logical storage device with a first host device, and data encrypted using a private key of the first host device is written to the first logical storage device. The storage array generates a snapshot or other copy of the first logical storage device, associates the copy of the first logical storage device with a second logical storage device, and data encrypted using a private key of a second host device is written to the second logical storage device. The storage array via its instance of key processing logic 321 provides the second host device via its instance of key processing logic 315 with access to an encrypted version of a public key of the first host device, encrypted using a public key of the second host device. This allows the second host device to obtain the public key of the first host device, so that the second host device can access particular data of the second logical storage device that was written using the private key of the first host device.

Responsive to a request from the second host device for particular data of the second logical storage device, the storage array is further configured to determine if the particular data was encrypted using the private key of the first host device or the private key of the second host device, and to provide the second host device with the particular data and an indication of a result of the determination.

For example, if the result of the determination is that the particular data was encrypted using the private key of the first host device, the indication directs the second host device to decrypt the particular data using the public key of the first host device, which is obtained by the second host device decrypting the encrypted version of the public key of the first host device using the private key of the second host device.

Alternatively, if the result of the determination is that the particular data was encrypted using the private key of the second host device, and the indication directs the second host device to decrypt the particular data using the public key of the second host device.

Such storage-side operations are illustratively performed using instances of key processing logic 321 and associated key data structures 322 in the storage array. Corresponding host-side operations are illustratively performed using path selection logic 314 and key processing logic 315 of the first and second host devices.

In the system 300, path selection logic 314 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of k paths to a shared storage array, or alternatively different ones of the host devices can have different numbers and types of paths to the storage array.

The path selection logic 314 of the MPIO layer 332 in this embodiment selects paths for delivery of IO operations to the one or more storage arrays having the storage array ports of the storage array port layer 338. More particularly, the path selection logic 314 determines appropriate paths over which to send particular IO operations to particular logical storage devices of the one or more storage arrays. At least a subset of the IO operations involve reading encrypted data written to one or more logical storage devices by one or more of the host devices. Such encrypted logical device access is controlled at least in part by host-side key processing logic 315 operating in conjunction with storage-side key processing logic 321, using information stored in one or more of the key data structures 322.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Referring now to FIG. 4, an example key data structure 400 utilized in providing logical storage device access in an encrypted storage environment as disclosed herein is shown.

In the example key data structure 400, which may be viewed as one of the key data structures 122 of the FIG. 1 embodiment or one of the key data structures 322 of the FIG. 3 embodiment, a storage array stores key information for a particular host device i, where i=1, 2, . . . N in a set of N host devices such as that shown in the FIG. 1 embodiment.

The stored information of the key data structure 400 more particularly comprises an identifier of the host device, as well as a public key for the host device. The public key for the host device is illustratively obtained by the storage array directly from the host device itself as part of an initialization process carried out between the storage array and the host device. Alternatively, such information can be obtained by the storage array via a central server such as the MPIO management station 116.

Additionally, the key data structure 400 includes encrypted public key information for at least one other host device. In this example, the key data structure 400 comprises encrypted public key information for each of at least three other host devices, illustratively denoted as Host X, Host Y and Host Z in the figure, each assumed to be a host other than host device i. More particularly, the key data structure 400 stores at least three different encrypted versions of the public key of host device i, each encrypted using a different public key of a different one of Host X, Host Y and Host Z. Accordingly, a first Encrypted Version X of the public key of host device i is encrypted using the public key of Host X, a second Encrypted Version Y of the public key of host device i is encrypted using the public key of Host Y, and a third Encrypted Version Z of the public key of host device i is encrypted using the public key of Host Z. This is an example of an arrangement in which multiple host devices including Host X, Host Y and Host Z are each provided with access to a copy of a logical storage device that includes data encrypted by another host device, in this case host device i.

In some embodiments, there are only two host devices, also denoted herein as Host 1 and Host 2, and representing any pair of the host devices 102 of system 100, that have written encrypted data to a copied logical storage device, and in such an arrangement an instance of the key data structure 400 for Host 1 may comprise just the Host 1 identifier, the Host 1 public key and the encrypted version of the Host 1 public key, encrypted using the public key of Host 2. Similarly, another instance of the key data structure 400 for Host 2 may comprise just the Host 2 identifier, the Host 2 public key and the encrypted version of the Host 2 public key, encrypted using the public key of Host 1.

The particular key data structure arrangement shown in FIG. 4 is only an example, and numerous other types and arrangements of key data structures can be utilized in other embodiments.

The above-described processes, algorithms and other features and functionality disclosed herein are presented by way of illustrative example only, and other embodiments can utilize additional or alternative arrangements.

Also, as mentioned previously, different instances of the above-described processes, algorithms and other logical storage device access techniques can be performed using different system components. For example, various aspects of logical storage device access functionality in some embodiments can be implemented at least in part using one or more servers that are external to a storage array 105 or other type of storage system. Also, key processing logic can be implemented using other types of host drivers, such as, for example, iSCSI drivers, or more generally other host device components.

The particular logical storage device access arrangements described above are therefore presented by way of illustrative example only. Numerous alternative arrangements of these and other features can be used in implementing the logical storage device access in other illustrative embodiments.

The illustrative embodiments disclosed herein can provide a number of significant advantages relative to conventional arrangements.

For example, such embodiments advantageously provide enhanced access for multiple host devices to snapshots, copies or other logical storage devices comprising encrypted data in an encrypted storage environment.

Various aspects of functionality associated with logical storage device access in an encrypted storage environment as disclosed herein can be implemented in a storage system, in a host device, or partially in a storage system and partially in a host device, and additionally or alternatively using other arrangements of one or more processing devices each comprising at least a processor and a memory coupled to the processor.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™, or Vblock® converged infrastructure from Dell Technologies.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the instances of path selection logic 114 and key processing logic 115 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic, initiators, targets, key processing logic, key data structures, and additional or alternative components. Also, the particular configurations of system and device elements and associated processing operations illustratively shown in the drawings can be varied in other embodiments. For example, a wide variety of different host device and storage system configurations and associated logical storage device access arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
at least one processing device comprising a processor coupled to a memory;
wherein the at least one processing device is configured:
to associate a first logical storage device of a storage system with a first host device, wherein data encrypted using a private key of the first host device is written to the first logical storage device;
to generate a copy of the first logical storage device in the storage system;
to associate the copy of the first logical storage device with a second logical storage device of the storage system, wherein data encrypted using a private key of a second host device is written to the second logical storage device; and
to provide the second host device with access to an encrypted version of a public key of the first host device, encrypted using a public key of the second host device, to allow the second host device to obtain therefrom the public key of the first host device, so that the second host device can access particular data of the second logical storage device that was written using the private key of the first host device;
wherein responsive to a request from the second host device for particular data of the second logical storage device, the at least one processing device is further configured to determine if the particular data was encrypted using the private key of the first host device or the private key of the second host device, and to provide the second host device with the particular data and an indication of a result of the determination; and
wherein the indication provided to the second host device is configured to selectively incorporate a particular one of at least first and second possible values, the first value directing the second host device to decrypt the particular data using the public key of the first host device and the second value directing the second host device to decrypt the particular data using the public key of the second host device.

2. The apparatus of claim 1 wherein the at least one processing device comprises at least a portion of the storage system.

3. The apparatus of claim 1 generating a copy of the first logical storage device comprises generating a snapshot of the first logical storage device.

4. The apparatus of claim 1 wherein the result of the determination is that the particular data was encrypted using the private key of the first host device, and the indication directs the second host device to decrypt the particular data using the public key of the first host device, which is obtained by the second host device decrypting the encrypted version of the public key of the first host device using the private key of the second host device.

5. The apparatus of claim 1 wherein the result of the determination is that the particular data was encrypted using the private key of the second host device, and the indication directs the second host device to decrypt the particular data using the public key of the second host device.

6. The apparatus of claim 1 wherein the at least one processing device is configured to store the public key of the first host device for use in decrypting encrypted data written by the first host device to the first logical storage device.

7. The apparatus of claim 1 wherein the at least one processing device is configured to store the public key of the second host device for use in decrypting encrypted data written by the second host device to the second logical storage device.

8. The apparatus of claim 1 wherein providing the second host device with access to an encrypted version of a public key of the first host device comprises providing the encrypted version of the public key of the first host device to the second host device in response to a command received from the second host device.

9. The apparatus of claim 8 wherein the command comprises a vendor unique command of a storage access protocol utilized by the first and second host devices to access the storage system over a network.

10. The apparatus of claim 8 wherein the command is received in the storage system from a multi-path input-output driver of the second host device.

11. The apparatus of claim 10 wherein the encrypted version of the public key of the first host device is decrypted, using the private key of the second host device, to obtain the public key of the first host device in a kernel-space portion of the multi-path input-output driver of the second host device.

12. The apparatus of claim 1 wherein the indication of the result of the determination comprises a check condition notification sent by the storage system to the second host device to direct the second host device to perform one of the following operations:
to decrypt the particular data using the public key of the first host device; and
to decrypt the particular data using the public key of the second host device.

13. The apparatus of claim 1 wherein the indication of the result of the determination comprises a status value sent by the storage system to the second host device to direct the second host device to perform one of the following operations:
to decrypt the particular data using the public key of the first host device; and
to decrypt the particular data using the public key of the second host device.

14. A computer program product comprising a non-transitory processor-readable storage medium having stored therein program code of one or more software programs, wherein the program code, when executed by at least one processing device comprising a processor coupled to a memory, causes the at least one processing device:
to associate a first logical storage device of a storage system with a first host device, wherein data encrypted using a private key of the first host device is written to the first logical storage device;
to generate a copy of the first logical storage device in the storage system;
to associate the copy of the first logical storage device with a second logical storage device of the storage system, wherein data encrypted using a private key of a second host device is written to the second logical storage device;
to provide the second host device with access to an encrypted version of a public key of the first host device, encrypted using a public key of the second host device, to allow the second host device to obtain therefrom the public key of the first host device, so that the second host device can access particular data of the second logical storage device that was written using the private key of the first host device;

wherein the program code, when executed by the at least one processing device, further causes the at least one processing device, responsive to a request from the second host device for particular data of the second logical storage device, to determine if the particular data was encrypted using the private key of the first host device or the private key of the second host device, and to provide the second host device with the particular data and an indication of a result of the determination; and wherein the indication provided to the second host device is configured to selectively incorporate a particular one of at least first and second possible values, the first value directing the second host device to decrypt the particular data using the public key of the first host device and the second value directing the second host device to decrypt the particular data using the public key of the second host device.

15. The computer program product of claim 14 wherein the result of the determination is that the particular data was encrypted using the private key of the first host device, and the indication directs the second host device to decrypt the particular data using the public key of the first host device, which is obtained by the second host device decrypting the encrypted version of the public key of the first host device using the private key of the second host device.

16. A method comprising:

associating a first logical storage device of a storage system with a first host device, wherein data encrypted using a private key of the first host device is written to the first logical storage device;

generating a copy of the first logical storage device in the storage system;

associating the copy of the first logical storage device with a second logical storage device of the storage system, wherein data encrypted using a private key of a second host device is written to the second logical storage device;

providing the second host device with access to an encrypted version of a public key of the first host device, encrypted using a public key of the second host device, to allow the second host device to obtain therefrom the public key of the first host device, so that the second host device can access particular data of the second logical storage device that was written using the private key of the first host device; and responsive to a request from the second host device for particular data of the second logical storage device, determining if the particular data was encrypted using the private key of the first host device or the private key of the second host device, and providing the second host device with the particular data and an indication of a result of the determination;

wherein the indication provided to the second host device is configured to selectively incorporate a particular one of at least first and second possible values, the first value directing the second host device to decrypt the particular data using the public key of the first host device and the second value directing the second host device to decrypt the particular data using the public key of the second host device.

17. The method of claim 16 wherein the result of the determination is that the particular data was encrypted using the private key of the first host device, and the indication directs the second host device to decrypt the particular data using the public key of the first host device, which is obtained by the second host device decrypting the encrypted version of the public key of the first host device using the private key of the second host device.

18. The method of claim 16 wherein the result of the determination is that the particular data was encrypted using the private key of the second host device, and the indication directs the second host device to decrypt the particular data using the public key of the second host device.

19. The method of claim 16 wherein providing the second host device with access to an encrypted version of a public key of the first host device comprises providing the encrypted version of the public key of the first host device to the second host device in response to a command received from the second host device.

20. The method of claim 19 wherein the command is received in the storage system from a multi-path input-output driver of the second host device.

* * * * *